United States Patent
Geiger

(10) Patent No.: US 6,477,835 B1
(45) Date of Patent: Nov. 12, 2002

(54) SINGLE-MOTOR INJECTION-AND-SCREW DRIVE HYBRID ACTUATOR

(75) Inventor: David Geiger, Orchard Park, NY (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 09/941,906

(22) Filed: Aug. 29, 2001

(51) Int. Cl.$^7$ .......................... F16D 31/02; F01B 21/00
(52) U.S. Cl. ................... 60/413; 91/464; 92/2
(58) Field of Search .............. 60/413, 414, 415, 60/417; 91/464; 92/2

(56) References Cited

U.S. PATENT DOCUMENTS

| | | | | |
|---|---|---|---|---|
| 1,913,663 A | * | 6/1933 | Ferris | 60/413 |
| 3,593,824 A | * | 7/1971 | Gregory | 187/253 |
| 4,242,944 A | * | 1/1981 | Su | 425/207 |
| 4,648,467 A | * | 3/1987 | Ahtola et al. | 173/107 |
| 5,596,823 A | * | 1/1997 | Clasen et al. | 37/232 |
| 5,687,567 A | * | 11/1997 | Hansson et al. | 60/413 |
| 6,095,028 A | * | 8/2000 | Lam.ang.s et al. | 91/417 R |
| 6,183,682 B1 | * | 2/2001 | Shimizu et al. | 264/328.1 |
| 6,192,299 B1 | * | 2/2001 | Kubota et al. | 700/204 |
| 6,257,859 B1 | * | 7/2001 | Koda et al. | 425/145 |

* cited by examiner

Primary Examiner—John E. Ryznic
(74) Attorney, Agent, or Firm—Phillips, Lytle, Hitchcock, Blaine & Huber LLP

(57) ABSTRACT

An improved device (10) for moving a load (11) rotationally and/or axially relative to a body (12) broadly comprises: a body; a motor (13) mounted on the body and having an output shaft (14) operatively arranged to move the load rotationally relative to the body; a piston (16) movably mounted on the body and defining therewith a variable volume first chamber (19), the piston being operatively arranged to move the load axially relative to the body; an accumulator (23) charged to a predetermined pressure; a fluid in the first chamber and accumulator; a pump (26) driven by the motor, the pump being operatively arranged to displace fluid from the first chamber to the accumulator; and a valve (28) operatively arranged to selectively permit pressurized fluid in the accumulator to flow into the first chamber to move the piston and load in one direction axially relative to the body.

12 Claims, 1 Drawing Sheet

US 6,477,835 B1

SINGLE-MOTOR INJECTION-AND-SCREW DRIVE HYBRID ACTUATOR

TECHNICAL FIELD

The present invention relates generally to the field of actuators for use in injection molding machines, and, more particularly, to an improved single motor-driven injection-and-screw drive hybrid actuator for an injection molding machine, or the like.

BACKGROUND ART

In the past, plastic injection molding machines have utilized hydraulic actuators, powered from a central hydraulic pumping system, to perform various machine functions, such as closing and holding the mold platen, rotating the plasticizer screw, and injecting the melted plastic into the mold. See, e.g., Technical Bulletin 145, "Controls for Injection Molding of Thermoplastics", Moog Inc., East Aurora, New York (Jun. 1980), the aggregate disclosure of which is hereby incorporated by reference.

There is now a trend to perform these functions with a multiplicity of directly-acting electric motors. However, experience has shown that such motors are often not well matched to the load demands, and that a better solution is the use of hybrid electric/hydraulic drives, such as those shown in Japanese Utility Model Post-Examination Publication No. 3-3389, and Applicant's pending application Ser. No. 09/709,904, both of which show hybrid mechanisms for operating mold closures. The first utilizes operation of an electric motor and screw mechanism to not only perform the primary function, but also to move a piston to compress a fluid into a hydraulic accumulator. This stored pressurized fluid is then employed subsequently to power a secondary function.

In one application, the present invention discloses a novel hybrid mechanism that stores some of the energy from the output of an electric motor that rotates the plasticizer screw of an injection molding machine. The axial reciprocating motion of the screw, which is utilized to store and inject melted plastic into the mold, is connected to a piston actuator. A pump, attached to the rotating motor shaft, is connected to the actuator so as to pump hydraulic fluid from the contracting actuator chamber when the screw is retracted, and to transfer it at high pressure into a pneumatically-charged accumulator. When the screw is to be extended, this pressurized fluid is subsequently allowed to flow back into the actuator through a metering valve that controls the rate of injection of the melted plastic into the mold.

DISCLOSURE OF THE INVENTION

With parenthetical reference to the corresponding parts, portions or surfaces of the disclosed embodiment, merely for purposes of illustration and not by way of limitation, the present invention broadly provides an improved device (10) for moving a load (11) rotationally and/or axially relative to a body (12).

The improved device broadly comprises: a body; a motor (13) mounted on the body and having an output shaft (14) operatively arranged to move the load rotationally relative to the body; a piston (16) movably mounted on the body and defining therewith a variable-volume first chamber (19), the piston being operatively arranged to move the load axially relative to the body; an accumulator (23) charged to a predetermined pressure; a fluid (e.g., hydraulic fluid) in the first chamber and accumulator; a pump (26) driven by the motor, the pump being operatively arranged to displace fluid from the first chamber to the accumulator; and a valve (28) operatively arranged to selectively permit pressurized fluid in the accumulator to flow into the first chamber to move the piston and load in one direction axially relative to the body, as when the load is to be extended.

In the preferred embodiment, the motor is electric, and the piston and pump are mounted coaxially with the motor output shaft. The fluid may be hydraulic fluid, and there may be a splined connection between the piston and motor output shaft. This splined connection couples the piston and load to rotate with the motor output shaft, but allows axial movement between the piston and load relative to the output shaft.

The invention may further include a variable-volume second chamber (20) defined by the piston and body. The volumes of the first and second chambers vary inversely when the piston moves relative to the body. The volumetic displacement of the first chamber may be substantially greater than that of the second chamber when the piston moves relative to the body, with the difference therebetween flowing to, or from, the accumulator. The second chamber may communicate with the fluid in the accumulator through the valve so as to selectively urge the piston to move in the opposite direction relative to the body. The valve may be an electrohydraulic servovalve, and the load may be the screw of an injection molding machine.

Accordingly, the general object of the invention is to provide an improved device for moving a load rotationally and/or axially relative to a body.

Another object is to provide an improved device for moving the screw of an injection molding machine rotationally and/or axially relative to a body.

These and other objects and advantages will become apparent from the foregoing and ongoing written specification, the drawings, and the appended claims.

DESCRIPTION OF THE PREFERRED EMBODIMENTS

Figure 1:
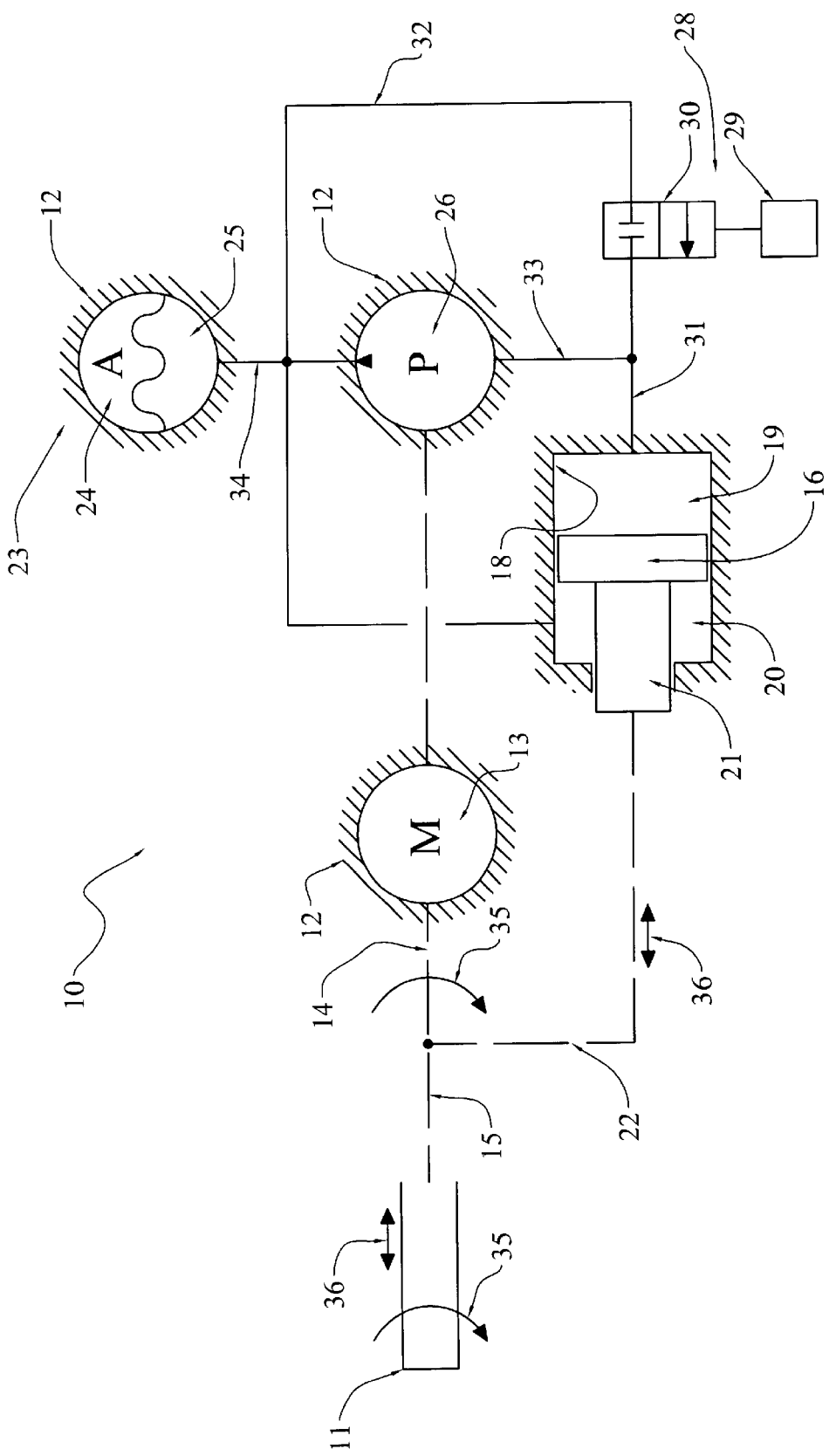
FIG. 1 is a schematic of the improved device.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up"and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawing, the present invention provides an improved device, generally indicated at 10, for controllably moving a load, indicated at 11, rotationally and/or axially relative to a body, schematically indicated at 12.

The improved device broadly includes a motor 13 mounted on the body and having an output shaft 14 operatively arranged to move the load rotationally relative to the body. This coupling, which may be a splined connection, is indicated by dashed line 15.

The improved device also includes a piston 16 mounted in a cylinder 18 formed in the body, and defining therewith a variable-volume first chamber 19 and a variable volume second chamber 20. The area of the piston facing into first chamber 19 is substantially greater than the area of the piston facing into second chamber 20. The piston is arranged to displace a rod 21, which, in turn, is arranged to move the load axially relative to the body. This connection is schematically indicated by dashed line 22.

The invention may further include an accumulator, generally indicated at 23. Accumulator 23 is shown as being of the diaphragm type, and has a pneumatic chamber 24 that is charged to a predetermined pressure. The accumulator is also shown as having another chamber 25. Chamber 25, as well as all conduits and chambers, are completely filled with a suitable fluid, such as incompressible hydraulic fluid.

The inventive device may further comprise a pump 26. In a preferred structural implementation, the piston and pump are mounted coaxially with the motor output shaft, although this structural arrangement is not necessarily indicated in the schematic view of FIG. 1. In fact, there may be a splined connection between the motor output shaft and the piston.

The invention may further comprise an electrohydraulic servovalve, generally indicated at 28. Servovalve 28 is shown as having an electrical section 29 and a hydraulic section 30. The hydraulic section communicates with the first chamber 19 via a conduit 31, and communicates with the second chamber via a conduit 32. The pump is arranged in a branch conduit 33 which communicates with conduits 31, 32. Another branch conduit 34 communicates with conduit 32 with accumulator fluid chamber 25.

The volumes of the first and second chambers 19, 20, vary inversely when the piston moves relative to the body; that is, as the volume of one chamber increases, the volume of the other decreases, and vice versa.

In practice, load 11 may be the plasticizer screw of an injection molding machine. It may be desired to rotate this screw relative to the body, and/or to move the screw axially relative to the body. To effect these ends, the motor is normally energized to rotate output shaft 14. This causes the motor and load to rotate together, as schematically indicated by arrows 35. At the same time (i.e., while the motor is rotating the load), the motor also operates pump 26, which pumps fluid from the first chamber 19 through conduits 31, 33, 34 to accumulator chamber 25. In this condition, the valve is in the condition shown. Also, some of the fluid withdrawn from first chamber 19 is fed back via conduit 32 to second chamber 20. Thus, as the motor rotates, the pump displaces a net amount of fluid (i.e., represented by the difference in the volumetric displacements of the first and second chambers) from the chambers to the accumulator fluid chamber 25, where it is continuously charged by the pressure in accumulator pneumatic chamber 24.

The device may be operated so as to move the screw and load in either axial direction relative to the body, this being indicated schematically by bi-directional arrow 36. To do this, the motor is normally stopped. During a prior period, the piston was moved rightwardly relative to the body. Valve 28 is then operated to move the hydraulic section to the alternative position. Hence, fluid may flow from accumulator chamber 25 via conduit 32, valve 28 and conduit 31 to piston first chamber 19. At the same time, fluid may flow from piston second chamber 20 via conduit 32 to join with this flow. Hence, such movement of the valve will allow pressurized hydraulic fluid from the accumulator to flow into the piston first chamber 19 and from the piston second chamber 20. This action selectively displaces the piston leftwardly relative to the cylinder, and allows the piston to extend the load relative to the body, such as when it is desired to discharge plastic into the mold.

When the valve is again operated to move its hydraulic section back to the position shown, fluid will be pumped from the first actuator chamber to the second chamber and to accumulator chamber 25, allowing the piston to retract (i.e., move rightwardly) relative to the body.

Therefore, the invention broadly provides an improved device for selectively moving a load, such as the screw conveyor of an injection molding machine, rotationally and/or axially relative to a body.

Modifications

The present invention contemplates that many changes and modifications may be made. For example, the invention should not be regarded as limited to displacing a screw-type conveyor of an injection molding machine. Thus, the use of such a device on an injection molding machine is only for purposes of illustration, and is not intended to be limitative of the scope of the appended claims. The device may be used on other devices as well. Indeed, load 11 should be regarded as being generic. The motor is preferably an electric motor. The pump is motor-driven, but may be of the variable-displacement type if desired. The accumulator may be either of the diaphragm type, or the piston-and-cylinder type, as desired. Other types of accumulators may also be used. The valve may be, but is not limited to, an electrohydraulic servovalve. Indeed, other types of valves may be alternatively employed.

Therefore, while a preferred form of the improved device as been shown and described, and several modifications thereof discussed, persons skilled in this art will readily appreciate that various additional changes and modifications may be made without departing from the spirit of the invention, as defined and differentiated by the following claims.

What is claimed is:

1. A device for moving a load rotationally and axially relative to a body, comprising:

a body;

a motor mounted on said body and having an output shaft operatively arranged to move said load rotationally relative to said body;

a piston movably mounted on said body and defining therewith a variable-volume first chamber, said piston being operatively arranged to move said load axially relative to said body;

an accumulator charged to a predetermined pressure;

a fluid in said first chamber and accumulator;

a pump driven by said motor, said pump being operatively arranged to displace fluid from said first chamber to said accumulator; and a valve operatively arranged to selectively permit pressurized fluid in said accumulator to flow into said first chamber to move said piston and load in one direction axially relative to said body.

2. A device as set forth in claim 1 wherein said motor is electric.

3. A device as set forth in claim 1 wherein said piston is mounted coaxially with said motor output shaft.

4. A device as set forth in claim 1 wherein said pump is mounted coaxially with said motor output shaft.

5. A device as set forth in claim 1 wherein said fluid is hydraulic fluid.

6. A device as set forth in claim 1, and further comprising: a splined connection between said piston and motor output shaft.

7. A device as set forth in claim 1, and further comprising: a variable-volume second chamber defined by said piston and body, and wherein the volumes of said first and second chambers vary inversely when said piston moves relative to said body.

8. A device as set forth in claim 7 wherein the volumetic displacement of said first chamber is greater than that of said second chamber when said piston moves relative to said body.

9. A device as set forth in claim 7 wherein said second chamber communicates with the fluid in said accumulator so as to urge said piston to move in the opposite direction relative to said body.

10. A device as set forth in claim 9 wherein said second chamber communicates with the fluid in said accumulator through said valve.

11. A device as set forth in claim 1 wherein said valve is an electrohydraulic servo-valve.

12. A device as set forth in claim 1 wherein said load is the screw of an injection molding machine.

* * * * *